US006118642A

United States Patent [19]

Benenati et al.

[11] Patent Number: 6,118,642

[45] Date of Patent: Sep. 12, 2000

[54] ELECTRONIC REGULATION CIRCUIT FOR DRIVING A POWER DEVICE AND CORRESPONDING PROTECTION METHOD OF SUCH DEVICE

[75] Inventors: Giovanni Benenati, San Giovanni la Punta; Sergio Pioppo, Mascalucia, both of Italy

[73] Assignee: STMicroelectronics, S.r.l., Agrate Brianza, Italy

[21] Appl. No.: 09/182,834

[22] Filed: Oct. 29, 1998

[30] Foreign Application Priority Data

Oct. 29, 1997 [EP] European Pat. Off. .............. 97830552

[51] Int. Cl.[7] ....................................................... H02H 3/27

[52] U.S. Cl. ................................. 361/89; 361/94; 361/74

[58] Field of Search .............................. 361/88, 89, 91.1, 361/91.3, 93.1, 94, 98, 100, 101, 72, 75; 327/306, 309

[56] References Cited

U.S. PATENT DOCUMENTS

| | | | |
|---|---|---|---|
| 4,849,850 | 7/1989 | Brahms | 361/101 |
| 4,977,477 | 12/1990 | Babico et al. | 361/98 |
| 5,299,087 | 3/1994 | Fermier et al. | 361/93 |
| 5,714,905 | 2/1998 | Galli et al. | 327/538 |
| 5,764,460 | 6/1998 | Perillo et al. | 361/18 |

FOREIGN PATENT DOCUMENTS

| | | |
|---|---|---|
| 0 699 987 | 3/1996 | European Pat. Off. . |
| 0 709 956 | 5/1996 | European Pat. Off. . |
| 29 23 960 | 12/1980 | Germany . |
| 41 20 478 | 12/1992 | Germany . |

OTHER PUBLICATIONS

Horowitz, P. et al., "Field Effect Transistors" The Art of Electronics *Cambridge University Press*, XP002059371, pp. 242–244, 1987. (No Month).

Horowitz, P. et al., "Active Filters and Oscillators" The Art of Electronics *Cambridge University Press*, XP002059372, pp. 162–166, 1987. (No Month).

*Primary Examiner*—Josie Ballato
*Assistant Examiner*—Kim Huynh
*Attorney, Agent, or Firm*—Theodore E. Galanthay, Esq.; Robert Iannucci, Esq.; Seed IP Law Group, PLLC

[57] ABSTRACT

An electronic regulator for driving a power device connected to an output load having a first portion and a second protection portion, the first portion including a controlled switching element connected upstream of the power device and controlled by a timer adapted to be operated in a short circuit or overload situation of the device, such that the load current can flow in the power device in a pulsed state clocked by the timer.

15 Claims, 3 Drawing Sheets

ELECTRONIC REGULATION CIRCUIT FOR DRIVING A POWER DEVICE AND CORRESPONDING PROTECTION METHOD OF SUCH DEVICE

TECHNICAL FIELD

This invention relates to an electronic regulator circuit for driving a power device comprising a protection portion, and to a corresponding protection method of such a device.

The invention has a specific application as a satellite receiver supply and control circuit, but can be used for regulating any electric loads.

BACKGROUND OF THE INVENTION

It is a recognized fact that electronic devices, and especially BJT transistors, should be operated within safe limits for proper operation and without the risk of becoming damaged.

In many applications, such devices are operated far from the limiting conditions; however, for some of them, such as power devices, it is extremely important to bring component performances to the limit, but without overtaking the limiting conditions which would result in the device being damaged.

Shown on a graph in FIG. 1 are the working points in safe limit conditions of a power transistor (FBSOA (Forward Base Safe Operating Area) curve). In particular, on the graph, a set of collector current curves are plotted against the collector-emitter voltage for a same power device as the duration of the base current varies.

As follows from this FIG. 1, if the base current is of the pulsed type, as the duration of the individual pulses decreases (100 msec, 1 msec, 100 μsec, 10 m sec, 1 μsec), the area included by the FBSOA curve (curves I, II, III, IV, V) increases.

In order to limit the maximum dissipatable power during operation, protection circuits are often associated with such devices. FIG. 1 also shows a curve (VI) of possible operation of a linear protection circuit according to the prior art.

A first embodiment of that protection circuit is shown in FIG. 2, which depicts an electronic regulator circuit for driving a power device Q0. That regulator circuit comprises a first driving portion 1 and a second protection portion 2.

That first driving portion 1 is realized by a first amplifier OP1 with a first input terminal I1 connected to a voltage reference Vref, a second input terminal I2 connected to a voltage divider Vd, and an output terminal O1 connected to a control terminal 6 of the device Q0.

The second protection portion 2 comprises a second amplifier OP2 having a feedback resistor Rs connected between its input terminals I3 and I4.

In particular, the amplifier OP2 is an operational stage with an inherent offset voltage Voffset.

The input I3 is connected to a terminal 4 of the power device Q0 through a series connection of a Zener diode Dz and a resistor R. An output terminal O2 of the second amplifier OP2 is connected to the terminal 6 of the device Q0.

One end of the resistor Rs is also connected to a terminal 5 of the device Q0, the other end being connected to the divider Vd.

In the circuit architecture of FIG. 2, the current flowing in the output load goes through the resistor Rs and is picked up at the input terminals of the amplifier OP2.

So long as the voltage picked up across the resistor Rs is lower than the voltage Voffset of the amplifier OP2, the output voltage of the power device Q0 will be regulated through the driving portion 1.

Upon the load current exceeding the maximum current for which the transistor Q0 has been designed, the increased voltage Voffset will set the protection circuit to operate.

A more detailed description of the operation of a regulator circuit of that type is found in U.S. Pat. No. 5,714,905, which is incorporated herein by reference.

While being in many ways advantageous, this solution has several drawbacks.

As the fabrication process varies, the operation curve of the protection circuit SOA can vary to the point of overtaking the FBSOA curve. To prevent the power device from operating outside the safe operation range, the power device is provided oversize such that the SOA curve is contained within the FBSOA curve with ample margin.

A first disadvantage of this solution is that the capacity for integration of the power device is altered for the worse, because its being oversize involves the use of a larger amount of silicon for its formation. This obviously results in an undesired cost increase.

A second disadvantage of this construction is the appearance of the so-called latch-down phenomenon in the regulator circuit. With high values of the power device working voltage, the protection circuit heavily limits the current delivered from Q0, which may create difficulties in initially charging the capacitive loads provided downstream of the circuit.

SUMMARY OF THE INVENTION

An embodiment of this invention provides an electronic voltage-regulating circuit with such structural and functional features as to allow the area included by the FBSOA curve to be increased for the same power device, thereby overcoming the limitations and drawbacks which are besetting electronic regulator circuits according to the prior art.

The embodiment introduces a timer in the protection circuit of the electronic regulator circuit such that the load current can flow in the power device in a pulsed state clocked by that timer.

The embodiment is directed to an electronic regulator circuit for driving a power device connected to an electric load, the circuit being of the type comprising a first driving portion and a second protection portion.

The embodiment also is directed to a method for protecting an electronic power device so as to improve its operation in a safe condition, of the type wherein a regulator circuit having a first driving portion and a second protection portion for detecting the limiting value of the load current of said power device, in a short circuit or overload situation, is associated with said device. Features and advantages of the electronic regulator device according to the invention will be apparent from the following description of an embodiment thereof, given by way of non-limitative example with reference to the accompanying drawings.

DETAILED DESCRIPTION OF THE INVENTION

Figure 1:
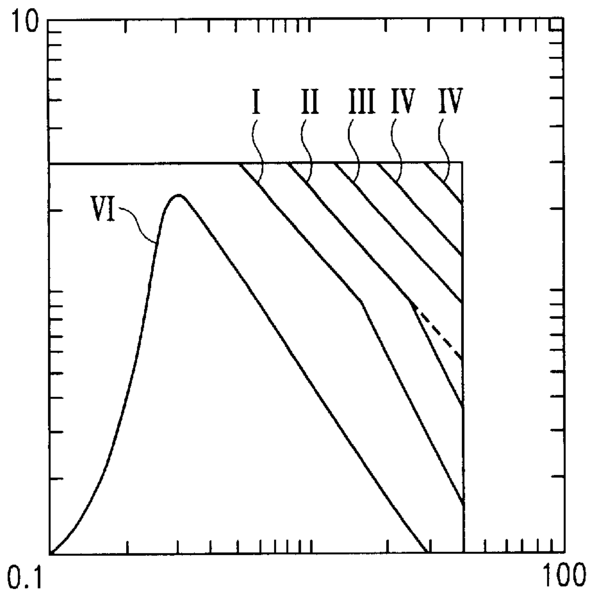
Fig. 1 (Prior Art)
FIG. 1 shows a voltage-current log plot of a set of FBSOA curves for a transistor, and an operation curve of a positive linear regulator circuit according to the prior art.
Figure 2:
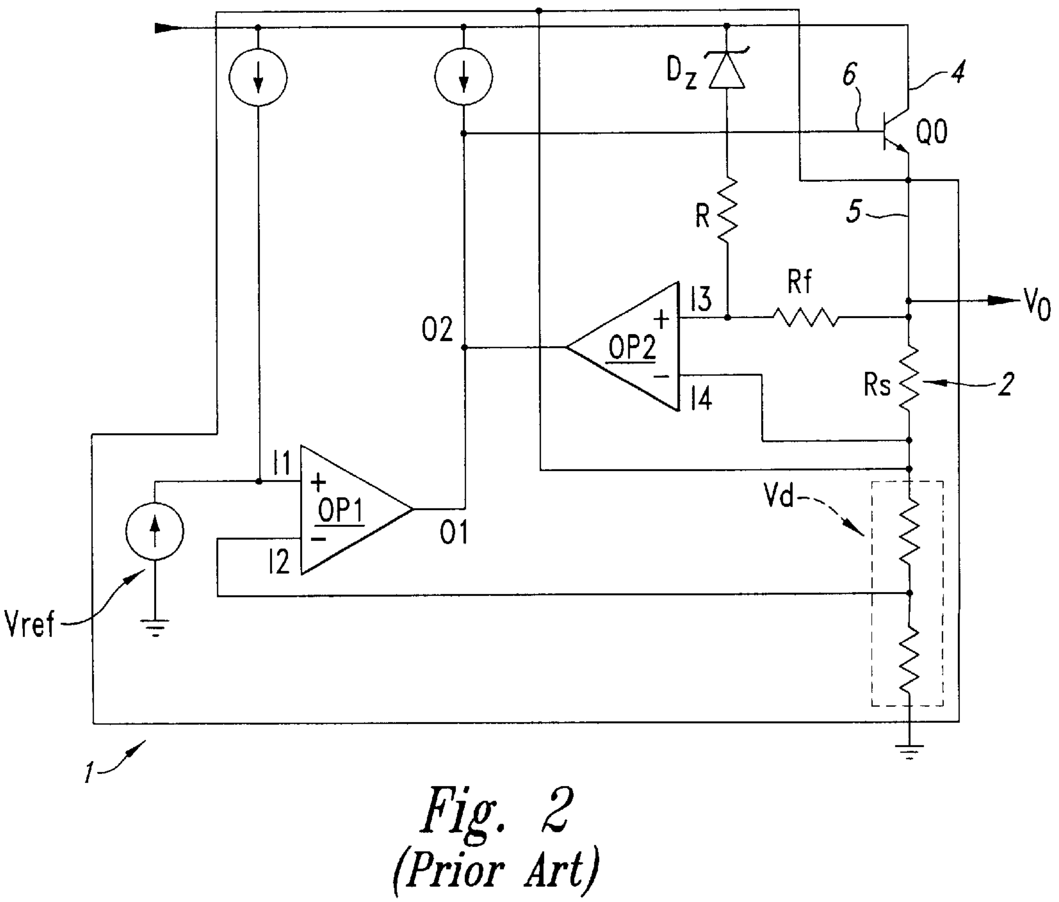
Fig. 2 (Prior Art)
FIG. 2 shows an electronic regulator circuit comprising a protection portion according to the prior art.
Figure 3:
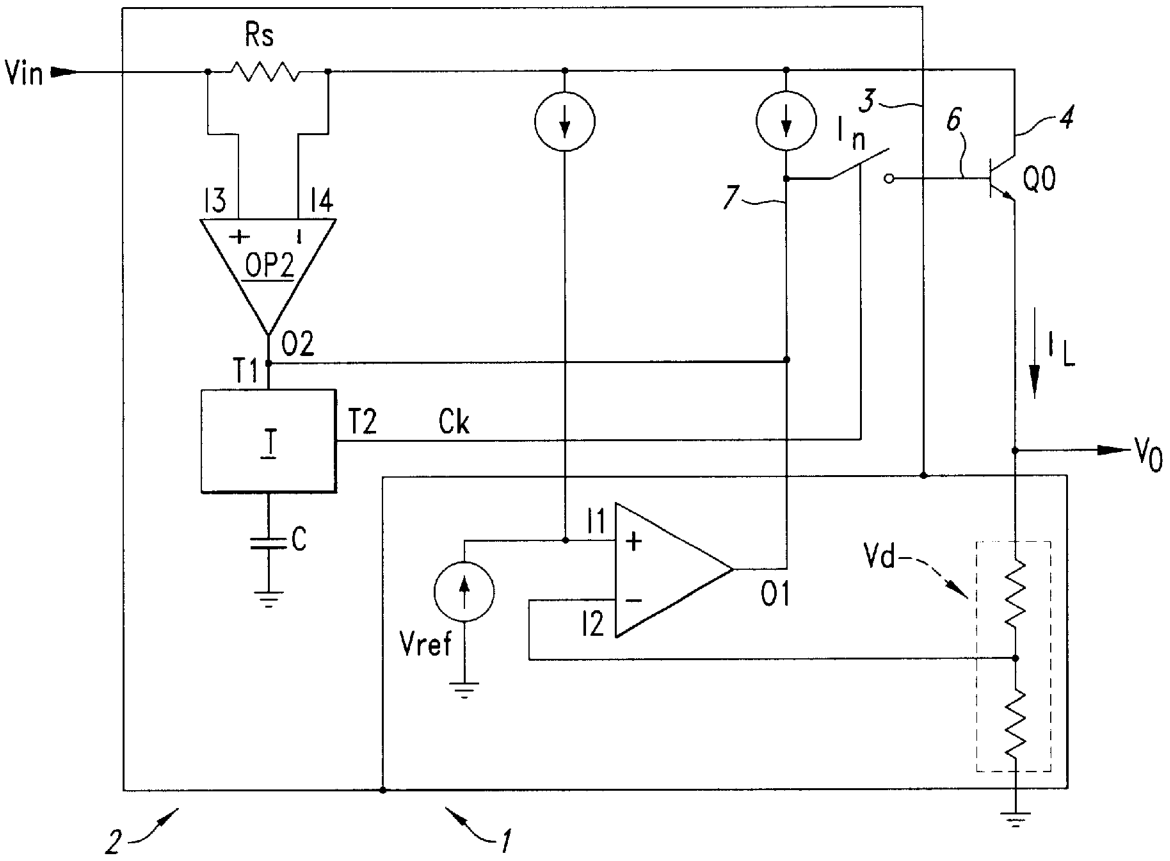
FIG. 3 shows an electronic regulator circuit comprising a protection portion according to this invention.

Referring to the drawing views, the electronic regulator circuit for driving a power device Q0 according to an embodiment of the invention comprises a first driving portion 1 and a second protection portion 2.

The first driving portion 1 comprises, in a known manner, an amplifier OP1, with a first input terminal I1 connected to a reference voltage generator Vref, and a second input I2 connected to a divider Vd.

An output terminal O1 is connected to a terminal 7 of a controlled switching element 3.

The second protection portion comprises an amplifier OP2. In particular, this amplifier OP2 is an operational stage with an inherent offset voltage Voffset.

The input terminals I3, I4 of the amplifier OP2 are connected across a resistor Rs.

One end of this resistor Rs is connected to a terminal 4 of the power transistor Q0, the other end being connected to the input Vin of the electronic regulator circuit.

The resistor Rs has a sufficiently low resistance not to interfere with the power transistor Q0 performance.

The output O2 of the amplifier OP2 is connected to the terminal 7 of the controlled switching element 3.

The output O2 is also connected to an input terminal T1 of a timer T. An output terminal T2 of the timer T is connected to the controlled switching element 3.

Additional circuit elements C are connected to the timer T. In particular, such elements may be implemented by a capacitor. This capacitor may either be integrated with the timer T or outside it.

The controlled switching element 3, therefore, is connected to the control terminal 6 of the power device Q0.

In a preferred embodiment the timer T is an oscillator and the controlled switching element 3 is a PMOS transistor whose control gate is driven as in FIG. 4, explained below. The transistor is preferably a PMOS transistor, an NMOS transistor, or other acceptable switching element. Also, the power device Q0 is a power transistor.

The operation of the regulator circuit according to the invention will now be described.

In normal operation, wherein the load current flowing in the transistor Q0 is within the safe limits, the voltage which is detected at the resistor Rs terminals, wherein substantially the same load current is flowing, is lower than the voltage Voffset at the input terminals of the amplifier OP2. Under this condition, the protection portion 2 is inactivated.

The timer T, therefore, is off and the output Ck is high and the controlled switching element 3 is closed and passes the drive current of the power transistor Q0.

In this condition, the driving portion 1 is regulating the output voltage Vo through the divider Vd, the amplifier OP2 and the voltage reference source Vref.

When the load current exceeds the maximum current for which the transistor Q0 has been designed, the consequently increased voltage across Rs activates the protection portion 2.

The amplifier OP2 limits the current which is flowing through the terminal 6 of the transistor Q0 such that the voltage drop across the resistor Rs will not exceed the preset voltage Voffset and a maximum load current is flowed in the transistor Q0 which is given as:

$$Isc=Voffset/Rs.$$

Simultaneously therewith, the oscillator T is activated whose oscillation frequency can be regulated by the capacitor C.

When the signal Ck delivered from the output terminal T2 of the oscillator T is high (Ton) the switch 3 is closed and the current Isc will be flowing through the transistor Q0.

When the signal Ck is low (Toff) the switch 3 is open and no load current is circulated; the load current will follow the same pattern as the signal Ck.

Figure 4:
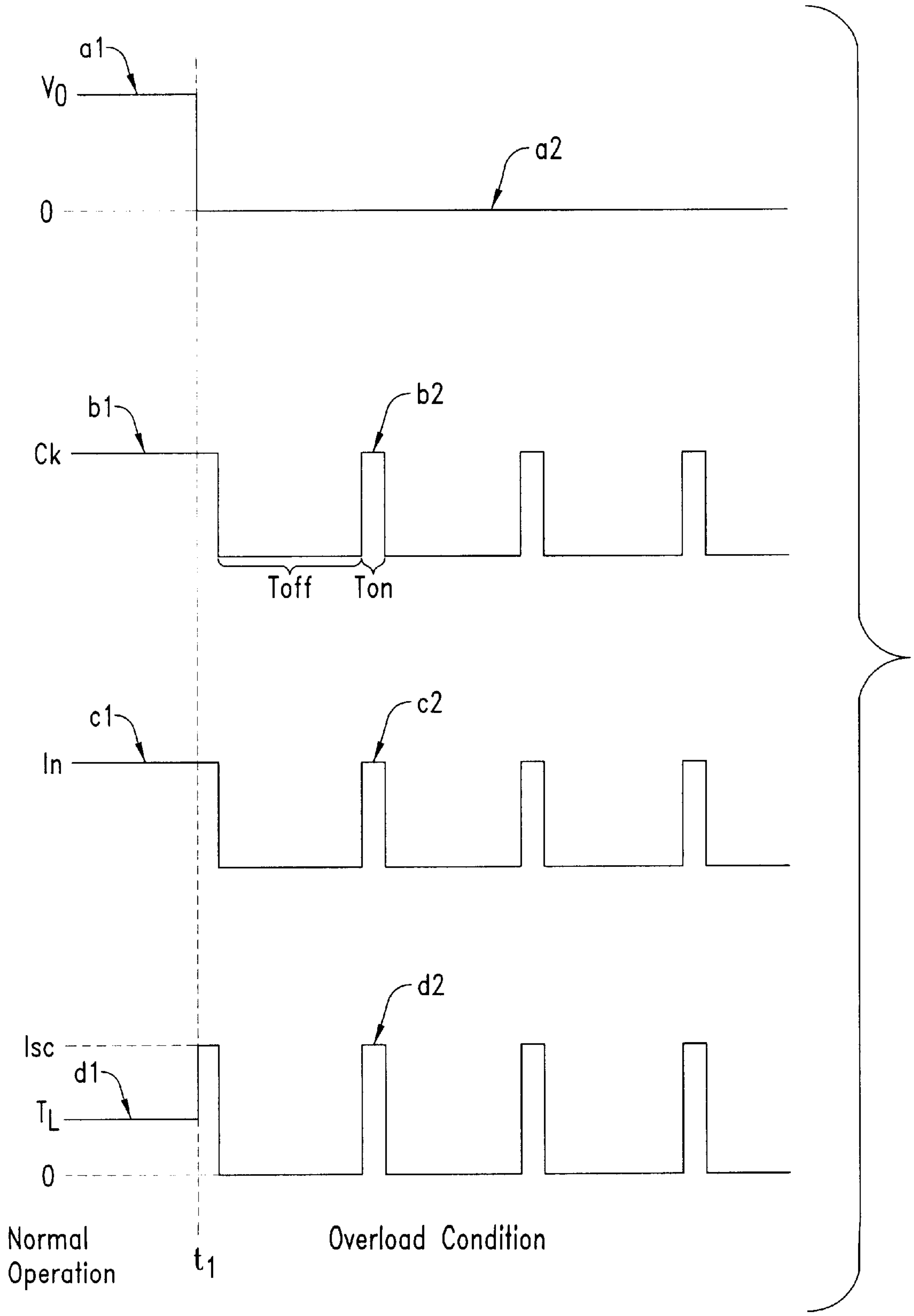
FIG. 4 is a plot against time of some signals which act in the protection portion and on the power device.

In FIG. 4, different signals acting in the protection portion 2 and on the transistor Q0 both in normal operation and during a short circuit or overload are plotted against time. To the left of the dashed line $t_1$ shows normal operation and at time $t_1$ the circuit enters overload condition, thus to the right $t_1$ shows overload protection operation.

The curve al represents the output voltage Vo supplied from the transistor Q0. In normal operation the value of the output voltage Vo is regulated by the driving portion 1, and the load current $I_L$ takes values between Isc and 0 (curve d1), while the signal Ck (curve b1) at the oscillator T output is high and a current In (curve c1) is flowing in the switch 3.

When the transistor Q0 is in an overloaded or shorted condition the voltage Vo=0 (curve a2) and the load current initially goes to the value Isc (curve d2). Consequently, the oscillator T is operated whose output signal Ck takes the form of a square wave with preset frequency and amplitude.

The current In (curve c2) and the load current (curve d2) are forced to follow the same pattern as the clock signal Ck, curve b2.

Thus with the type of regulation provided the mean dissipated power in an overload condition is less than that dissipated power in normal operation. In fact, in the circuit of this invention the mean dissipated power in a short circuit situation is given as:

$$Pd(cc)=Vin*Isc*Ton/(Ton+Toff)$$

while the maximum dissipated power in normal operation is given as:

$$Pd(normal)=(Vin-Vo)*Isc.$$

Referring to such formula, in an embodiment implemented with BCD (Bipolar Cmos Dmos) technology of a supply and control circuit of a satellite receiver, the following measurements were taken of the maximum dissipated power in normal conditions Pdmax(normal) and that in an overloaded condition Pd(short).

In this application, with the short circuit current Isc equal 750 mA, the output voltage Vo of the power device equal 18 V, the maximum supply voltage equal 26 V, the time Ton being one fourteenth the time Toff, it is:

$$Pdmax(normal)=(26-18)V*0.75A=6W$$

while the dissipated power in the overloaded condition is:

$$Pd(short)=26V*0.75A/15=1.3W$$

In summary, the electronic regulator circuit according to the invention allows of a lower dissipated power in the overloaded condition than the maximum dissipated power in normal operation.

In addition, with the regulator circuit of the invention the FBSOA curve increases as the conduction time Ton of the power device in the overload state decreases for the same power device.

It being possible to select a preferred frequency of the square wave generated by the oscillator T or vary that frequency. The conduction period Ton can also be selected, while keeping the ratio Ton/Toff unaltered, such that any capacitive loads downstream of the circuit can be charged without problems overcoming the latch-down problem. This can be accomplished by selecting the value of capacitor C or otherwise programming the timer circuit T. Of course, the ratio $T_{ON}/T_{OFF}$ can also be selected as needed for a particular application.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An electronic regulator circuit for driving a power device connected to an electric load, comprising a first driving portion and a second protection portion, wherein said first driving portion comprises a controlled switching element having first and second conduction terminals and a control terminal, the second conduction terminal being connected to a control terminal of said power device, and the second protection portion includes an overload detector structured to detect a short circuit or overload situation of the power device and having an output coupled to the first conduction terminal of the controlled switching element, the second protection portion further including a timer having an input coupled to the output of the overload detector and an output coupled to the control terminal of the controlled switching element, the timer causing the controlled switching element to periodically drive the power device during the short circuit or overload situation of the power device.

2. A drive regulator circuit according to claim 1, wherein said timer includes an oscillator.

3. A drive regulator circuit according to claim 2, wherein said oscillator has an frequency of oscillation adjustable by means of at least one circuit element.

4. A drive regulator circuit according to claim 3, in that said at least one circuit element includes a capacitor.

5. A drive regulator circuit according to claim 1, wherein said overload detector comprises a resistive element connected between a power supply and a conduction terminal of said power device; and an operational amplifier having first and second inputs respectively connected to opposite ends of the resistive element and an output connected to said timer.

6. A drive regulator circuit according to claim 1, wherein said switching element is a switch.

7. A drive regulator circuit according to claim 1, wherein in that said switching element is a PMOS transistor having a gate electrode driven by the timer.

8. An electronic regulator circuit for driving a power device for powering an electric load, the regulator circuit comprising:

a controlled switching element having first and second conduction terminals and a control terminal, the second conduction terminal being coupled to a control terminal of the power device;

an overload detector having an input coupled to the power device and structured to detect an overload or a short circuit condition of the power device and produce a detection signal at an output in response thereto;

a drive circuit coupled to the first conduction terminal of the switching element and structured to drive the power device through the switching element during a normal operation phase; and a timer having an output coupled to the control terminal of the switching element and an input coupled to the output of the overload detector and structured to control the switch element in response to receiving the detection signal from the overload detector.

9. The regulator circuit of claim 8 wherein the timer includes an oscillator.

10. The regulator circuit of claim 9 wherein said oscillator has a frequency of oscillation that is adjustable.

11. The regulator circuit of claim 10 further comprising a capacitor connected to the oscillator in a manner that determines the frequency of oscillation of the oscillator.

12. The regulator circuit of claim 8 wherein the overload detector includes a resistive element and an operational amplifier each connected to a conduction terminal of the power device, the resistive element being connected between first and second inputs of the operational amplifier which also has an output is connected to the input of the timer, the overload detector thereby detecting a load current in the power device.

13. The regulator circuit of claim 8 wherein the switching element includes a PMOS transistor having a gate electrode driven by the timer.

14. The regulator circuit of claim 8 wherein the output of the overload detector is connected to the first conduction terminal of the switching element.

15. A method of protecting a power device to improve its operation in a safe condition, comprising:

detecting an overvoltage or a short circuit condition in the power device and supplying a detection signal in response thereto; and periodically interrupting current flow through the power device in response to the detecting act, wherein the periodically interrupting act includes supplying the detection signal to a timer that, in response to receiving the detection signal, transmits a clock signal to a control terminal of a switch having a first terminal that receives the detection signal and a second terminal that is coupled to a control terminal of the power device, the clock signal periodically opening and closing the switch to periodically interrupt the detection signal from reaching the control terminal.

* * * * *